United States Patent
Sims et al.

(10) Patent No.: US 8,952,830 B2
(45) Date of Patent: Feb. 10, 2015

(54) VEHICLE SAFETY WARNING AND INFORMATION SYSTEM

(75) Inventors: Stephen James Sims, Sprent (AU); Wayne David Maxwell, Nietta (AU); Jason Edward White, Spreyton (AU); Andrew Philip Perkins, Devonport (AU); Norman George Ballard, Corlette (AU)

(73) Assignee: Status Technologies Pty Ltd, Sprent, TAS (AU)

( * ) Notice: Subject to any disclaimer, the term of this patent is extended or adjusted under 35 U.S.C. 154(b) by 46 days.

(21) Appl. No.: 13/816,790

(22) PCT Filed: Aug. 23, 2011

(86) PCT No.: PCT/AU2011/001077
§ 371 (c)(1),
(2), (4) Date: Feb. 13, 2013

(87) PCT Pub. No.: WO2012/024722
PCT Pub. Date: Mar. 1, 2012

(65) Prior Publication Data
US 2013/0141251 A1    Jun. 6, 2013

(30) Foreign Application Priority Data

Aug. 23, 2010   (AU) ................................. 2010903755

(51) Int. Cl.
  *G08G 1/09*   (2006.01)
  *G08G 1/0967*   (2006.01)
  *B60Q 9/00*   (2006.01)
  *G08G 1/16*   (2006.01)

(52) U.S. Cl.
  CPC .......... *G08G 1/096791* (2013.01); *B60Q 9/008* (2013.01); *G08G 1/161* (2013.01)
  USPC ......................... 340/905; 340/425.5; 340/953

(58) Field of Classification Search
  USPC .............. 340/905, 425.5, 438, 441, 901–904, 340/915–918, 910, 936, 953
  See application file for complete search history.

(56) References Cited

U.S. PATENT DOCUMENTS

| | | | | |
|---|---|---|---|---|
| 5,684,474 | A | * | 11/1997 | Gilon et al. .................... 340/903 |
| 7,188,005 | B2 | * | 3/2007 | Toba et al. ......................... 701/1 |
| 8,340,894 | B2 | * | 12/2012 | Yester ............................ 701/301 |
| 2003/0139867 | A1 | * | 7/2003 | Browne et al. .................. 701/45 |
| 2008/0082261 | A1 | * | 4/2008 | Tengler et al. ................ 701/210 |
| 2008/0100428 | A1 | * | 5/2008 | Price ............................. 340/435 |
| 2010/0066562 | A1 | | 3/2010 | Stählin et al. ................. 340/902 |
| 2014/0093132 | A1 | * | 4/2014 | Stein et al. ..................... 382/104 |

FOREIGN PATENT DOCUMENTS

| | | | | |
|---|---|---|---|---|
| GB | 2 204 435 | A | * | 4/1987 |
| GB | 2 204 435 | | 11/1988 | ............... G08G 1/16 |

OTHER PUBLICATIONS

International Search Report for International Application No. PCT/AU2011/001077, Nov. 16, 2011.

* cited by examiner

*Primary Examiner* — Daniel Previl
(74) *Attorney, Agent, or Firm* — Kusner & Jaffe (57) ABSTRACT

The present invention provides an improved vehicle safety warning system which enables a warning of a potential or an actual hazard to be transmitted via a signal between two or more vehicles, a device for use in such a system and an improved vehicle rally safety warning and information system.

15 Claims, 9 Drawing Sheets

▨ BLUE

FIG. 4b

▨ BLUE

FIG. 4c

▨ BLUE

Rally Safe Stages Data Collection

Messages

| Stage No. | Car No. | Longitude | Latitude | Transmission |
|---|---|---|---|---|
| 32 | 888 | -41.16269 | 146.16228 | SLOW |
| 32 | 888 | -41.18182 | 146.15943 | SOS |
| 44 | 274 | -41.16269 | 146.15972 | OVERTAKE |
| 32 | 888 | -41.16269 | 146.16228 | SLOW |
| 32 | 888 | -41.18182 | 146.15943 | SOS |
| 32 | 888 | -41.18182 | 146.15943 | OK |
| 07 | 801 | -41.18182 | 146.16228 | HAZARD |
| 32 | 888 | -41.18182 | 146.15943 | SOS |
| 32 | 888 | -41.16269 | 146.16228 | SLOW |

Unofficial Stage Times

| Stage No. | Car No. | Start Time UTC | End Time UTC | Stage Time |
|---|---|---|---|---|
| 01 | 002 | 22:59:35 | 22:59:36 | |

Settings

Stage Number - SS [14 ▼]

Select COM Port [COM31 ▼]  [Open Port] [Close Port]

Warnings

Invalid Message - Checksum doesn't match

VEHICLE SAFETY WARNING AND INFORMATION SYSTEM

TECHNICAL FIELD

The present invention relates to the provision of electronic warning signals and/or information between vehicles within a predetermined range. These vehicles may be in the motor-sport area, off-road recreational vehicles, marine vehicles, industrial vehicles and the like involved in a common purpose such as an event, race, rally or traveling on a particular route.

BACKGROUND

Vehicle accidents are an accepted part of life. In racing car or motorbike rally situations certain conditions may contribute to accidents or increase the seriousness of accidents. It is common for vehicles travelling at high speeds and/or in close proximity to have serious accidents or near misses because there is no warning system which can be activated quickly enough for the vehicles following behind.

In addition to warning of hazards for vehicles, drivers and event managers engaged in motorsport rally events or the like may benefit from receiving other data about road conditions and relevant safety factors.

A number of diverse proposals have been put forward for vehicle safety warning systems such as U.S. Pat. Nos. 6,426,706, 6,587,043, 7,679,499, 7,557,693, US patent applications No. 2010/0066562 and 2008/0100428 and UK patent application No. 2204435. None of these, however, provides an entirely satisfactory accident warning system particularly in the situations contemplated above.

The above references to and descriptions of prior proposals or products are not intended to be, and are not to be construed as, statements or admissions of common general knowledge in the art.

DISCLOSURE OF THE INVENTION

The present invention provides in its broadest form an improved vehicle safety warning system which enables a warning of a potential or an actual hazard to be transmitted via a signal between two or more vehicles, said system comprising a first vehicle having a signal transmission means and a signal reception means; and at least a second vehicle having a compatible signal transmission and reception means, the improvement comprising wherein the warning, when activated is a persistent visual indicator (until deactivated) and wherein the indicator comprises a predetermined code recognizable by the drivers of the vehicles.

The term "vehicle" refers to any motorized or other vehicle likely to travel at speed such as cars, motorbikes, off-road recreational vehicles, passenger vehicles, marine vehicles such as boats, industrial vehicles such as those used in the mining and agricultural industries and the like. The term includes accessories, instrumentation and/or sensors carried by or inside the vehicle.

The term "safety warning system" refers to the provision of advance notification of a danger or a potential danger or the need for caution on the route being travelled by the vehicles.

The term "potential or actual hazard" refers to a perilous situation such as a major collision, a road which is partly or fully blocked, a vehicle breakdown or when a vehicle is approaching at speed from behind a relatively slow moving vehicle.

The term "signal transmission means" refers to any suitable means of transmitting a wireless signal. Preferably this will be a UHF signal transmitter modulated to comply with the relevant regulations governing radio frequency transmissions or alternatively the transmission may be via Satellite or GSM.

The term "signal reception means" refers to a receiver capable of receiving a signal. Preferably this is a UHF receiver.

The term "compatible signal transmission means and signal reception means" refers to a transmitter and receiver capable of communicating with the reception and transmission means in the first vehicle.

The term "activated" means that the signal is initiated. In a preferred aspect the signal is activated manually by pressing a button, screen, preset condition or the like. The signal may be deactivated manually or automatically.

The term "persistent visual indicator" refers to a signal which is continuous, lasting or enduring as opposed to an audio signal which is transmitted, and if not heard, or consciously heard by the driver, the driver remains unaware of the signal. The term "persistent" means persistent within that allowed by the regulations. In contrast to audio signals currently used, the present invention provides a persistent visual indicator such as a light, which may be a coloured light either flashing or constant which remains visible until switched off or changed to another signal by manually upgrading or downgrading the warning the indicator represents.

The term "predetermined code" means that the indicator has a predetermined meaning understood by the drivers. For example, an indicator comprising a red light signifies a major accident whereas amber light signifies a road blockage and so on. Preferably the predetermined code corresponds to the colours used on flags used in International racing.

Preferably the visual indicator is generated by, or emanates from an indicator display means. Preferably this is in the form of a screen or buttons which may be illuminated. Depending on the situation the visual indicator or a corresponding visual indicator may be displayed in the transmitting vehicle as well as the receiving vehicle.

In another aspect the invention provides an electronic communication device for a vehicle said device suitable for gathering and relaying relevant information about other vehicles fitted with a similar device on a route, said device comprising: one or more signal transmission means and one or more signal reception means, an information display means for displaying the information, sensors for detecting predetermined conditions and a processor and associated software for managing the information and signals.

The term "relevant information" refers to information relevant to the driver and/or vehicle such as the speed and/or condition of nearby other vehicles travelling on the route, speed restrictions on a particular part of the route, a perilous situation on the route such as a major collision, a roadway which is partly or fully blocked or a vehicle breakdown.

The term "similar device" refers to a device with the same capabilities as the electronic communications device.

The term "route" refers to a route on a road, race track, circuit or the like.

The term "an information display means" refers to a screen, panel or console or the like.

The term "sensor" refers to a device for sensing or reporting on the position or condition of the vehicle such as a GPS transceiver, accelerometer, a gyroscope and the like.

The term "predetermined conditions" refers to when a vehicle has stopped moving or has left the roadway or track, has overturned or the like.

The term "processor" refers to an electronic information processor such as a microprocessor or the like.

The term "associated software for managing the information and signals" refers to computer programs and related data. For example, location coordinates of the route may be logged into the software along with rules about when signals may be transmitted and what information is displayed.

The other vehicles are fitted with compatible one or more signal transmission means and one or more signal reception means.

In a preferred form the device comprises a UHF transceiver, optionally a GPS transceiver, a power supply which is circuit protected with a built-in backup battery and a mountable aerial suitable for the dashboard or another location on a vehicle and a human machine interface (HMI) such as a screen capable of displaying different colours and/or lights and/or text messages which indicate the relevant warnings.

Preferably the device has a continuous power supply and therefore cannot be turned off even in the event of a collision. This allows communications to be continuous.

In another aspect the present invention provides an improved system of communication of safety information suitable for communication between at least two vehicles on a route said system comprising: a) providing a signal transmission means and a signal reception means to a first vehicle and; b) providing a compatible signal transmission means and a compatible signal reception means to at least one other vehicle; c) providing a communication signal means to the vehicles which means is acitvatable by one or more of a driver, the vehicle or a sensor in the vehicle and results in d) the information being displayed as a persistent visual indicator (until deactivated) which has a predetermined meaning recognizable by the drivers.

The term "safety information" refers to information relevant to the safety of the driver and/or vehicle such as the speed and/or condition of nearby other vehicles travelling on the route, speed restrictions on a particular part of the route, a perilous situation on the route such as a major collision, a roadway which is partly or fully blocked or a vehicle breakdown.

The term "a communication signal means" refers to any appropriate means for generating a communication signal and includes radio frequencies such as UHF, GSM or the like.

The term "activatable" means able to be activated, directly or indirectly by a driver, co-driver or passenger, his vehicle or a sensor. Where activation is indirect this is generally through a processor appropriately programmed which determines whether a certain condition has been met and then causes the appropriate signal to be sent.

Preferably the route to be traveled is for a common purpose such a race, rally or track or transport route along a roadway at a mining or industrial site or the like.

In another aspect the invention provides an improved vehicle rally safety warning system which allows communication of hazards or potential hazards between drivers and/or their vehicles by providing a visual indicator for predetermined conditions selected from a set of distinguishable visual indicators said system comprising a first vehicle having a signal transmission means and a signal reception means; and at least a second vehicle having a compatible signal transmission and reception means whereby a communication signal means is activatable by one or more of a driver, a vehicle or a sensor in the vehicle and activation results in a visual indicator in one or more of the vehicles, which indicator persists until deactivated.

The term "vehicle rally" refers to a gathering of vehicles which travel along the same road way or surface during a race or the like. This may be on a race circuit, public roads or an off road event.

The term "a visual indicator for predetermined conditions" refers to one or more indicators or signals visible to the driver such as a LCD or other suitable screen or a light or a text display which indicates a set of conditions. The distinguishable visual indicators may be selected from a set of indicators which denote conditions relevant to the driver such as a warning of a major incident, an indication to be cautious, an indication that there has been a vehicle breakdown ahead and that the road is not obstructed or that a following driver is travelling fast and intends to pass.

In a preferred aspect the above system of the present invention is provided with an additional warning system which generates an automatic signal to vehicle controllers and/or other vehicles on a route when a vehicle traversing the route moves outside of one or more predetermined parameters on the route, said predetermined parameters being sensed by GPS.

The term "automatic" means that the warning system works by itself without direct human intervention.

The term "generates an automatic signal to vehicle controllers and/or other vehicles" means a signal is produced which is transmitted to vehicle controllers (such as race managers, Race Control or Event Control) and/or vehicles on the track or road. Generally this is achieved by UHF transmission but can also be sent via GPS or GSM. Preferably once the movement outside of a predetermined parameter is sensed by the GPS, this is detected by an onboard microprocessor which then causes the relevant signal to be transmitted via UHF, GSM and/or Satellite communications.

Preferably an automatic warning signal is also generated in the case of a vehicle impact or if the vehicle speed is below a predetermined value.

The term "predetermined parameters" refers to points on the route such as the road edge coordinates, vehicle orientation to track, significant deviation from expected speeds such as vehicle deceleration or stopping or vehicle impact.

Preferably the route is a mapped route.

The term "mapped route" refers to a route on the road, race track circuit or the like for which the location coordinates, such as each side of the road or track have been mapped over its entire length thus providing a base map. The base map is logged into the on-board programmable software in the vehicles.

In yet another aspect the invention provides an improved vehicle rally safety warning and information system which allows communication of a hazard, a potential hazard or other relevant information between master control and drivers and/or vehicles or between drivers and/or vehicles by providing a visual indicator for predetermined conditions selected from a set of distinguishable visual indicators said system comprising: a master control having a signal transmission means and a signal reception means, a first vehicle having a signal transmission means and a signal reception means; and at least a second vehicle having a signal transmission and reception means wherein the signal transmission means and the signal reception means are compatible and whereby a communication signal is activatable by master control, a driver and/or a vehicle and results in the visual indicator in one or more of the vehicles which indicator persists until deactivated.

The term "other relevant information" refers to countdown to start time, instructions such as "GO", weather conditions, speed restriction zone, town speed limit (Quiet Zone), chicane, virtual chicane, a change of route, cancellation of the rally or race or the like.

The term "master control" refers to a communications control unit operated by rally, race or event organizers with all the required communications transceivers, computer with relevent data collected on a data base which is displayed as information regarding status of vehicles and progress of event. Preferably the computer has an internet connection to facilitate other communications during the rally or race.

Any warning data generated between vehicles can also be transmitted via Satellite or GSM (Global System for Mobile Communications) to an operations database such as a database present in master control. In a more preferred form of the invention, Global Positioning Satellite (GPS), Digital Radio Telemetry (DRT), Satellite Communications (SC) and Global System for Mobile Communications (GSM) work together with the processor using communications which are on-line and available to get the information out rapidly.

Preferably the visual indication is given if the hazard or potential hazard is about 2000 m or less from a receiving vehicle, more preferably about 1000 m or less from a receiving vehicle and still more preferably about 500 m or less from a receiving vehicle.

The invention also provides a method of conducting or controlling a motor vehicle race or rally using the systems and/or devices of the present invention.

BRIEF DESCRIPTION OF THE DRAWINGS

The invention will now be described with reference to the following non limiting illustrative drawings.

FIG. 8 shows a master control screen shot of the Stage status of vehicles.

Figure 1:
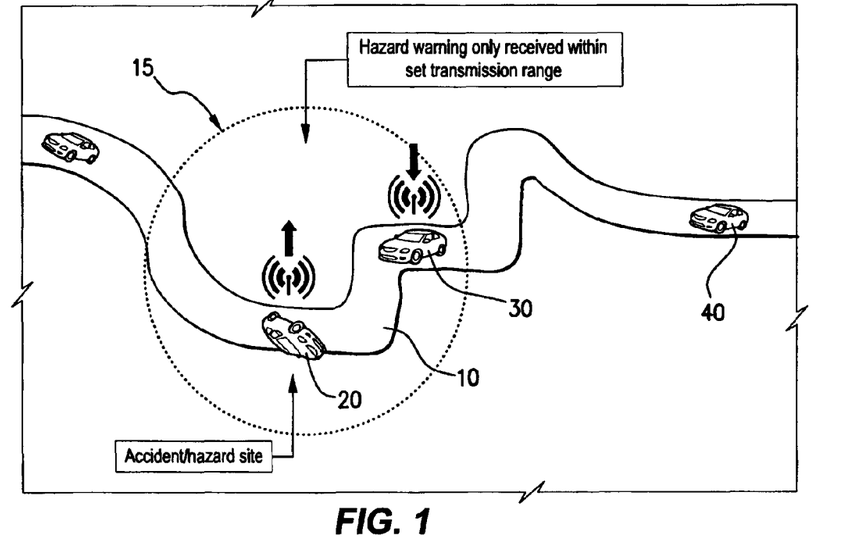
FIG. 1 is a schematic drawing of the vehicle to vehicle operation mode of the present invention.

As shown in FIG. 1 after a sharp turn in roadway 10 vehicle 20 has overturned. This is sensed by a gyroscope present in a vehicle unit which transmits a warning to following vehicle 30 alerting following vehicle 30 that there has been an accident. The range of the signal 15 shows that the second following car, 40 does not receive any information about this accident. The advantage of this is that drivers are not overwhelmed with too much information at one time. Drivers are only informed of hazards or potential hazards which are imminent.

In a preferred form, the invention combines the basic functions described above and a Global Positioning System (GPS) receiver with either inbuilt or remote aerial to suit the application. Where the vehicle is enclosed it may be mounted on the dashboard so antenna damage is unlikely in a rollover or impact or the antenna may be mounted on the roll cage or other exterior position. Any suitable aerial may be utilized and would be known to one skilled in the art.

This preferred form of the invention provides incorporation of GPS technology which significantly improves hazard warning functionality and other information in the system. In addition to the basic warnings, data generated from the GPS is displayed on the screen.

Figure 2:
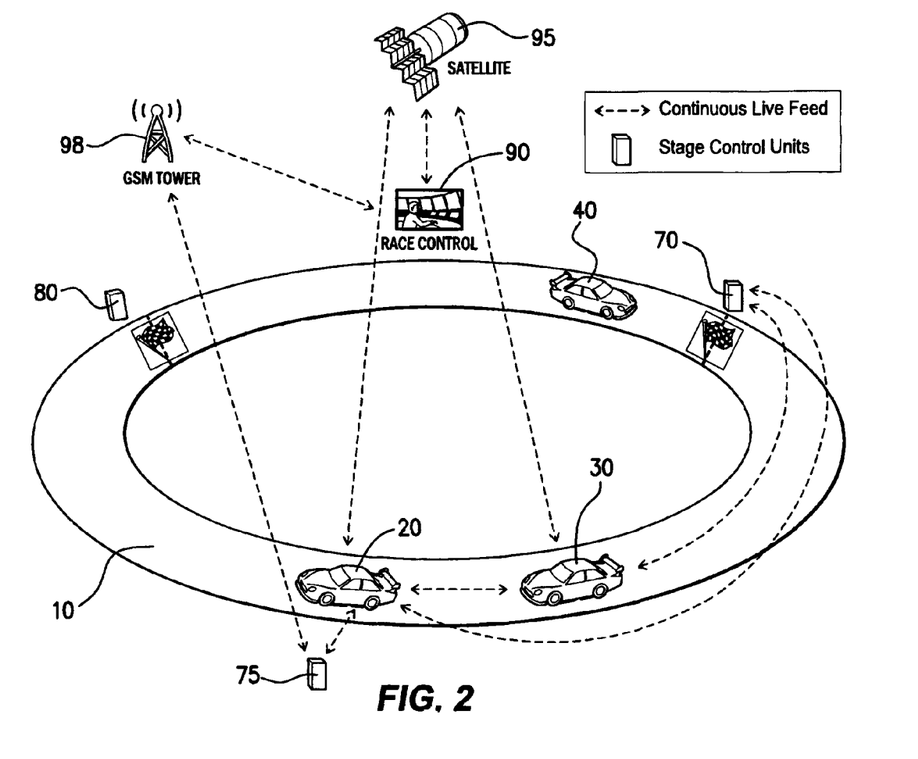
FIG. 2 is a schematic representation of a vehicle to vehicle and vehicle to Race Control mode of the present invention showing Satellite and GSM (Global System for Mobile) communications.

FIG. 2 shows an alternative embodiment where base stations 70 and 80 and repeater station 75 receive a signal from car 20. In this case a warning signal would only be transmitted to following car 30. The stations have several transmission options using different frequencies which allow this mode only to be used for specific hazards such as red for a major incident affecting the whole rally event. Alternatively other vehicles operate as repeater stations. This system extends the range of signals to potentially cover the whole course and operates as a de facto, mesh or ad hoc network.

Optionally an additional audio warning (buzzer) is incorporated, which would be received in the vehicle crew's headsets as well as an audible tone from the vehicle unit.

Where the satellite link is not available radio communications take over. For example when a vehicle rolls over the satellite antenna may not be operational however an SOS signal via the short distance radio link is transmitted to following vehicles within range. Since the vehicle also have the ability to form ad-hoc networks, a vehicle which has received the SOS can send the message via another following vehicle to race control.

The inventors have identified the need for data other than safety hazard warnings to be available particularly in racing events.

As well as the function of a vehicle hazard warning system, the preferred combination invention also provides position, speed, time and other safety related data for vehicles. This makes the whole system a very efficient vehicle management and event control system for motor sport organizers.

The basis for the automatic generation of hazard warnings is the ability of GPS to monitor the absolute location of a vehicle on a race track or road and continuously compare this with previously mapped coordinates of the road extremities. As relative movement is also monitored, any variation from normal vehicle position or speed is immediately identified and a warning activated without any human intervention.

On a race track, these types of warnings are currently verbally communicated to Flag Marshalls, with significant delays and lack of definitive information. This addresses significant legal liability issues for Flag Marshalls and event organisers by limiting human error and overcoming slow reaction time where Flag Marshalls are unable to signal quickly enough to warn drivers.

In its basic form the electronic communication device of the present invention provides for the rapid transmission of warning signals from one vehicle unit to others within a predetermined range. The warning signals transmitted relate to potentially hazardous on-road situations resulting from a vehicle accident, breakdown or other problem which could affect road users in the immediate area. The advantage of the present invention is that the transmitted signals are received by other vehicle units as a visual communication means in the form of a screen of a particular colour optionally with a text message or as coloured warning lights, or other visual means to rapidly identify a predetermined range of situations.

The vehicle unit works by having a UHF transceiver that can be operated via pushbutton, to transmit a signal which activates corresponding visual communication means on a control panel of a receiving vehicle or optionally base and/or relay stations. These warning procedures can be initiated manually via the buttons, or when an impact on the vehicle has occurred, or if a vehicle is stopped/moving slowly within a predefined area, or other pre-determined condition. In an emergency such as an accident a warning signal is automatically triggered by an accelerometer which senses the severity of the impact.

Further in a preferred embodiment the system can also automatically send an SMS text message via the mobile phone network or Satellite if required.

Unlike existing systems the warning signal of the present invention remains active indefinitely. That is the warning signal is persistent and notifies other vehicle units of its status within a predetermined proximity or range. Most vehicle-based warning systems use an audible signal or verbal radio communication which unless heard by the driver at the time fails to have its intended effect.

An advantage of the present invention is that it works very well in difficult terrain such as mountainous roads which have hairpin bends.

Vehicles are provided with a UHF and GPS transceiver and power supply in a purpose-built housing or enclosure. The UHF transceiver may be of any suitable type such as 433 mHz, 2.4 GHz or 910 mHz depending on frequency regulations. Similarly the GPS receiver may be of any suitable type such as a GPS module with an iridium satellite 9602 modem.

Figure 3:
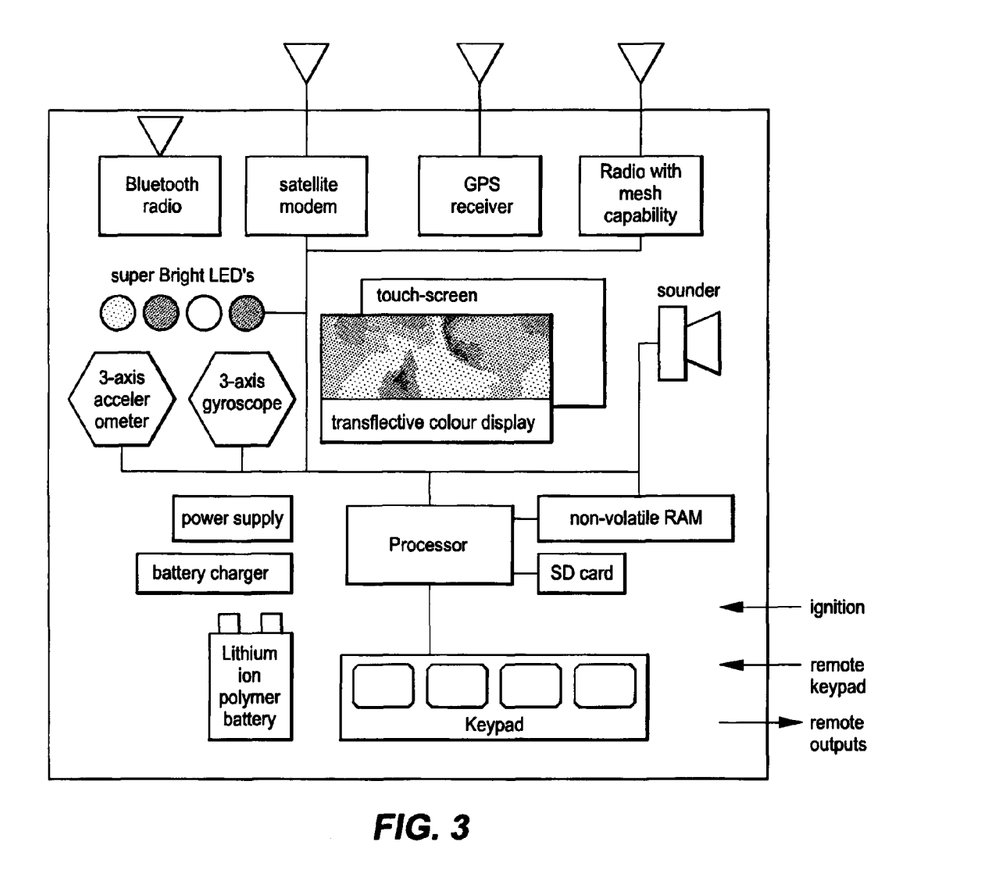
FIG. 3 is a schematic representation of the vehicle unit.

A schematic representation of the vehicle unit is shown in FIG. 3. Preferably this comprises a purpose built enclosure in a suitable metal housing or housing of other material such as an anodized aluminium enclosure. In one embodiment the vehicle unit weighs only 300 g and is 140×120×40 mm in size.

The power supply of the vehicle unit is circuit protected with a backup battery built-in and operates at very low power input and is designed to allow the system to operate from 6 to 36V (vintage 6V cars, modern 12V vehicles and 24V trucks). A backup battery is used to power the critical parts (processor, sensors and radios) of the system if the vehicle power supply fails. The power supply is designed to provide a least 3 hours operation in case the vehicle battery is disconnected or damaged as the result of an accident.

The display is immediately put in a low power mode if the main vehicle supply power fails. A Lithium Ion Polymer battery is used due to its large capacity and inherent safety. The battery has various safety facilities such as over-voltage and over-temperature protection built in.

The core of the Vehicle Display Unit (VDU) is the processor, which is typically a 32 bit embedded microprocessor (MPU). The MPU performs all the calculations required in the system and controls all the inputs and outputs. The MPU is programmed with appropriate software, the writing of which would be well within the ability a person skilled in the art. There may be slave processors populated that assist with peripheral control. Typically the radios, satellite modem and GPS receiver will have slave processors.

The MPU is connected to a RAM device that is used to store all real-time data such as race times, trip distances, critical system parameters and alarm status. The RAM device has been chosen because it can store data when it is not powered, typically has billions of read/write cycles and is extremely fast.

A SD (secure digital) card interface is included to allow for mass data storage. The storage may be used, amongst other things for: a) storage of race parameters such as stage names and other data associated with a race (provides a simple way for race organizers to load the system with a new race), b) system parameters such as time, date, latitude, longitude, speed, 3-dimensional acceleration, status, start and stop times are logged to the SD card up to 10 times a second, c) images provided by sponsors can be stored on the card to allow them to be loaded at appropriate times during the race.

Figure 4A:
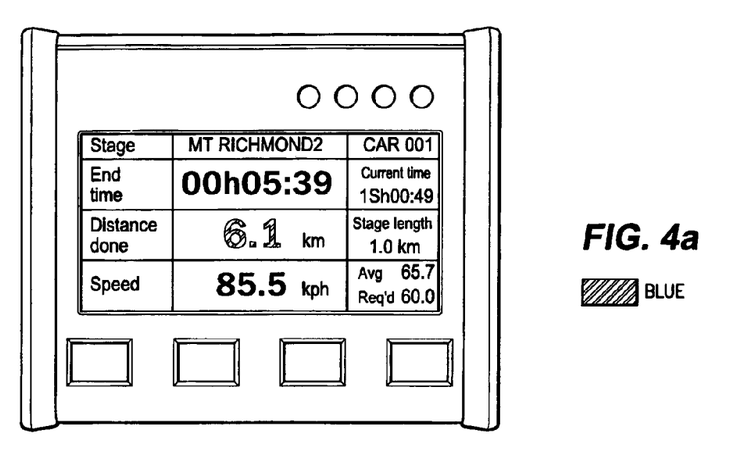
FIG. 4a shows the vehicle unit displaying the Race screen at a stage in the race.

The vehicle unit is mounted on the dashboard and comprises a human machine interface in the form of transflective screen with pushbuttons. These buttons are capable of causing a signal to be transmitted from the vehicle. Cables connect the vehicle unit to the vehicle's power supply as well as GPS, GSM and DRT antennas. A keypad as well as an optional touch-screen and external remote keypad allow user inputs such as to allow overtakes to be requested. A full colour display has been chosen to allow various graphics to be displayed with maximum visibility. The display is a so-called transflective display which uses a LED backlight to illuminate the display in low light situations; it also uses a one way mirror which enables the display to use the ambient light to amplify the image brightness. The combination of LED backlight and one way mirror means that the display is extremely visible even in direct sunlight. A row of high bright LEDs is used to further alert the driver of an impending situation. Provision has also been made for externally mounted lights. Depending on what is displayed on the screen the push buttons may correspond to various sections of the screen. For example during an uneventful period in the race the screen will show the stage of the race, the car number, the anticipated duration of the stage, the anticipated end time of the stage, the current time, the distance already traveled and the stage length, current speed, average speed for the stage and required speed as shown in FIG. 4a.

Figure 4B:
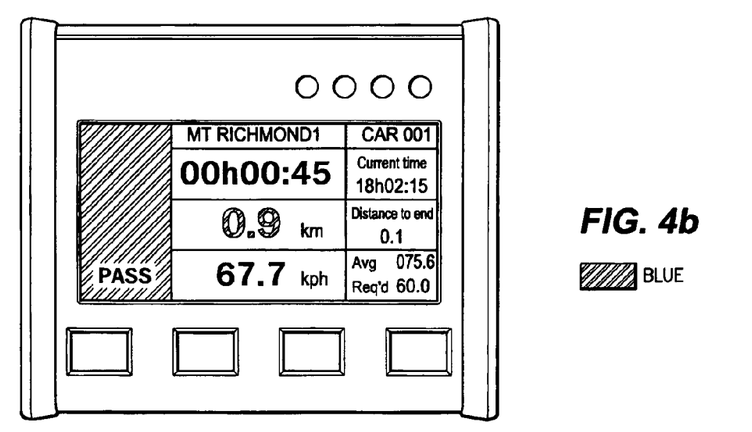
FIG. 4b shows the Race screen when there is an opportunity to pass a vehicle traveling ahead.
Figure 4C:
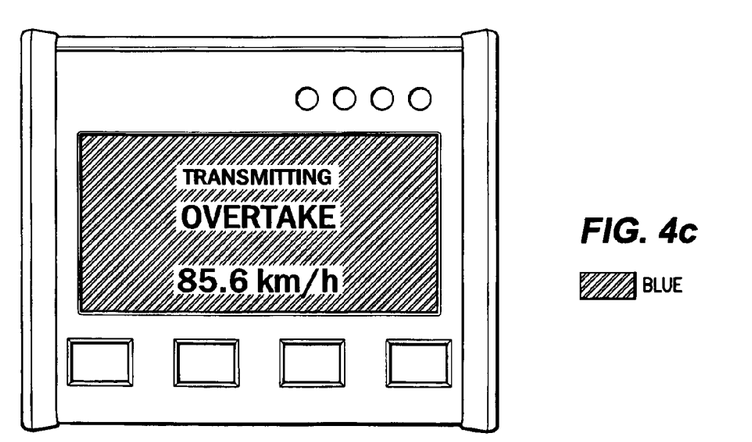
FIG. 4c shows the Race screen of a transmitting vehicle when the Driver has taken indicated the he is overtaking the vehicle traveling ahead.

When a predetermined condition is met such as there is a slower vehicle traveling ahead the vehicle unit detects this and the left hand section of the screen turns blue and displays the message "PASS" (FIG. 4b). If the Driver wishes to pass he will push the button adjacent this section of the screen and a message will be transmitted to the vehicle ahead. The overtaking driver is made aware of this by the screen background turning entirely blue and showing the message "TRANSMITTING OVERTAKE" and displaying the speed of his vehicle. The receving vehicle ahead is also appropriately alerted.

Figure 5A:
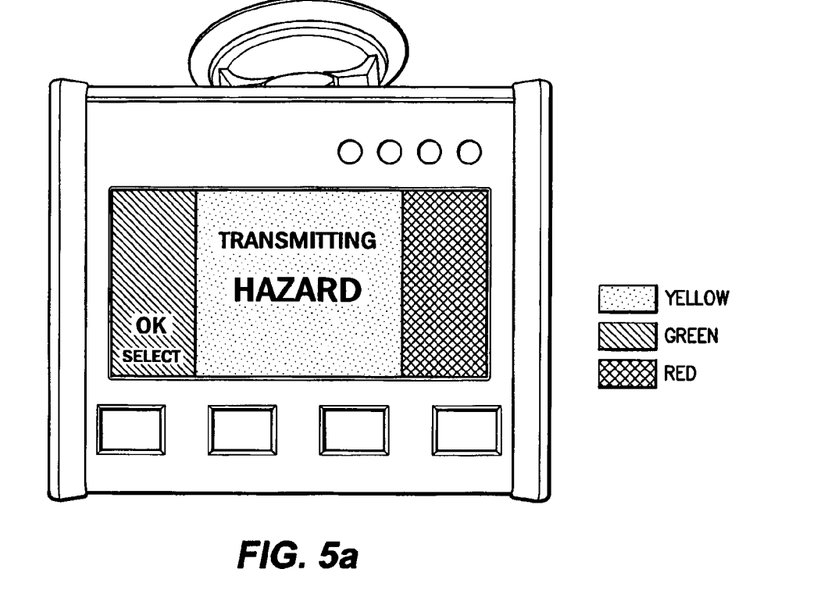
FIGS. 5a and 5b show the vehicle unit displaying the Race screen when the vehicle encounters an apparent hazard and the option of overriding the hazard warning or confirming it.
Figure 5B:
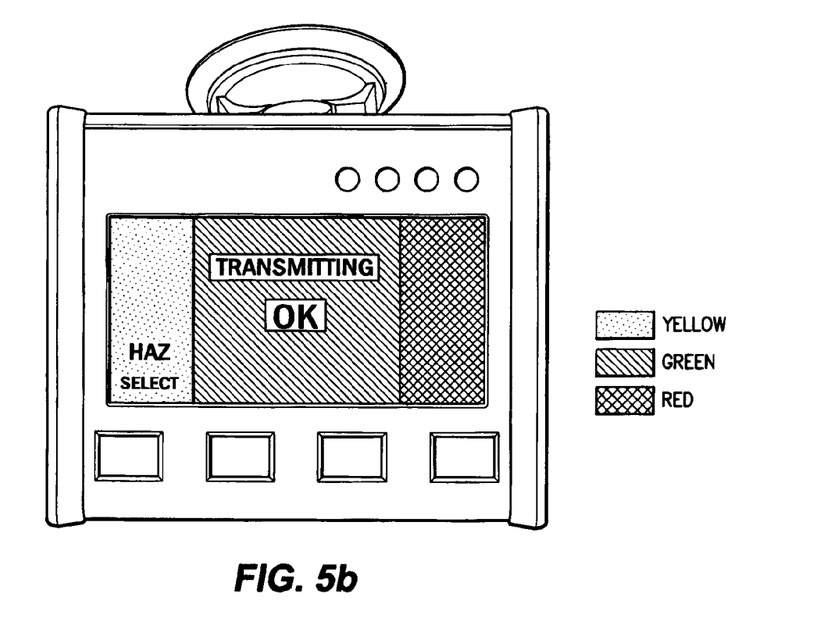

In situations where a vehicle stops during the race the vehicle unit transmits a hazard warning indicated by the yellow centre section of the screen such as in FIG. 5a with a green section on the left of the screen indicating "OK" and a red section on the right hand side indicating SOS. The Driver can either confirm the hazard by pressing the button adjacent to the red section or overrule it by pressing the button adjacent to the green section with the appropriate message being sent out. Where the Driver selects OK then this is shown by the centre section of the screen turning green and displaying "TRASMITTING OK" with options to change this should the situation require it (see FIG. 5b).

Figure 6A:
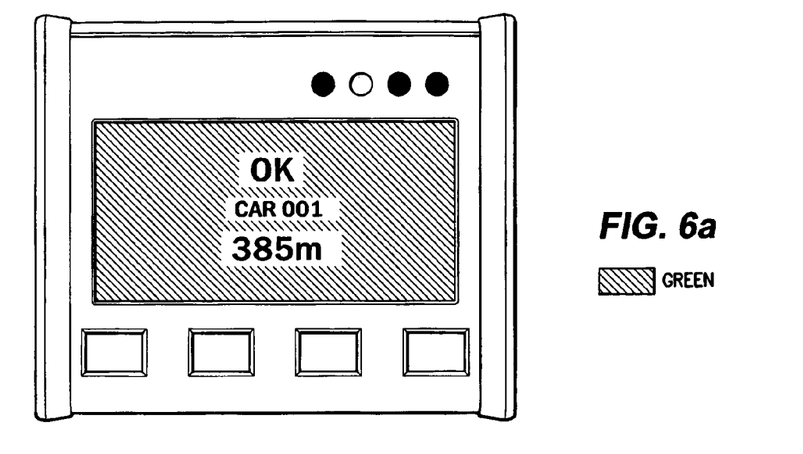
FIGS. 6a to 6c show the race screen displayed in a following receiving vehicle indicating whether the transmitting vehicle ahead is OK, experiencing a hazard or an SOS.
Figure 6B:
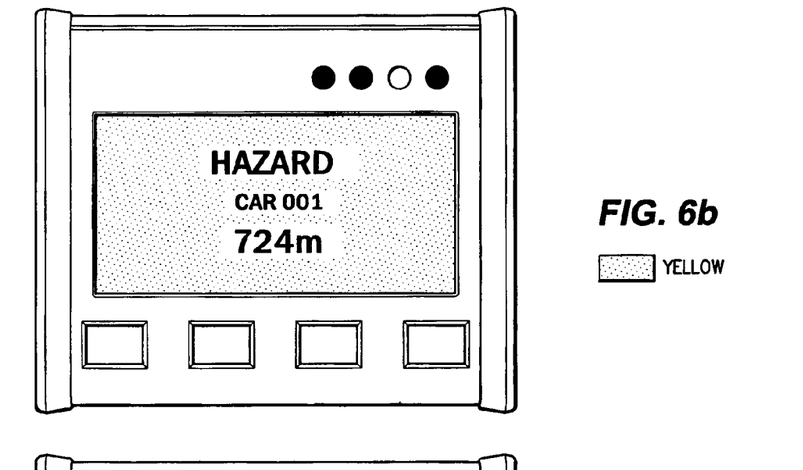
Figure 6C:
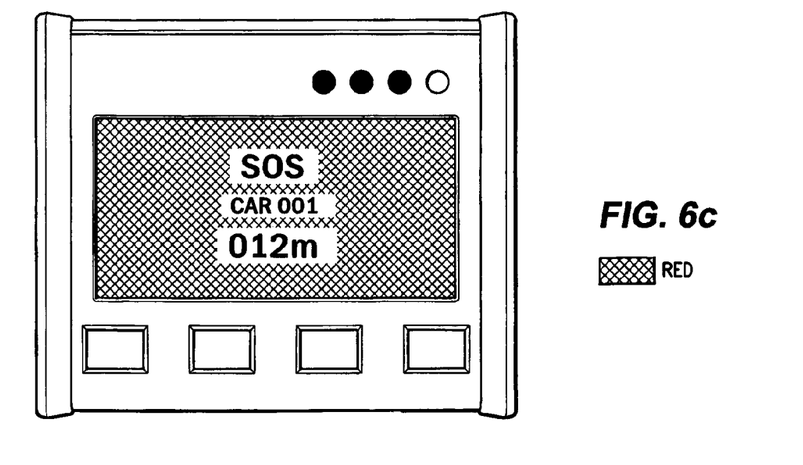

The screen is also used to signal to the driver a warning or other predetermined condition received from another vehicle. The predetermined code used to indicate the various conditions may be generally as follows: red denotes SOS such as a major accident, or that medical or other assistance is required. Yellow denotes a hazard and that caution is required. This may mean that the road is partly blocked and following vehicles must slow down but no assistance is required. Green denotes that a vehicle is OK. This may be a situation where a vehicle has broken-down but not obstructing the road. Blue indicates a faster vehicle is approaching from behind giving the "push to pass" signal.

Three axis accelerometers and three axis gyroscopes are used to monitor the vehicle and report potential accident situations. Algorithms are used to detect potential accident and rollover situations. If an accident is detected, the unit automatically starts to transmit an alarm status.

The GPS receiver determines the speed of the vehicle and also its location with up to 20 fixes per second being received. The speed in conjunction with the other sensors is used to determine if there is a potential problem with the car, which if detected starts the automated alarm transmission system. GPS speed and position in conjunction with the accelerometer outputs is used to calculate transit and race start and stop times. Transitioning between stage sections such as transit to quiet zone is accomplished using GPS position related to stage co-ordinates stored on the SD-card. Speeding in quiet zones and chicanes is detected using GPS speed.

A short range radio with a range of less than 1 km is used to transmit events that may have occurred. If, for instance, a vehicle has slowed to a dangerous speed and is still in a race stage, a hazard message is transmitted. The hazard message contains the identification of the vehicle in distress, its location and the type of distress. This information is sent regularly (typically once per second) to all vehicles. Those vehicles that are within a 1 km range receive the message and use the location information to determine if they are approaching the vehicle in distress. If they are approaching, a warning is displayed, indicating the distance to the vehicle in distress. The moment the vehicle passes the vehicle in distress, the message disappears from the passing driver's screen. The event that was received is however logged to the device's memory and is immediately relayed via satellite to race control. In the event that the satellite link is not operational, the vehicle that has received the distress signal will transmit an SOS point by the side of the road as soon as it detects one. As mentioned above, the radios also have the ability to form a mesh network, so that in the event of the satellite link being broken, the message can be passed between vehicles to race control. For instance if a vehicle rolls over and cannot transmit to the satellite, it starts to transmit an SOS signal via the short distance radio link to a following vehicle which gets a visual warning that the vehicle is ahead by so many meters. Following vehicles store the SOS message and the location and identification of the transmitting vehicle. Following vehicles transmit the incident immediately via satellite. If the satellite link is broken the vehicles will send the message via radio via the SOS point to race control. Vehicles will also report the incident via radio at the end of the race. The radio can also be used to upload stage data at the start of a race amongst other functions.

A satellite modem is used to communicate between race control and the vehicles during an event. Satellite was chosen as events are regularly held in locations where there is not GSM, 3G/NextG or other cellular coverage. The particular satellite receiver used was chosen because of global coverage and low latency transmission, which means that data sent by the VDU is received quickly at race control. The satellite link is used to track the vehicles, with vehicles sending position updates at a regular distance interval. In the event of an incident, immediate transmissions are made. This is true for the scenario of a vehicle having an incident or of a vehicle receiving an incident report via the short range radio link. Stage data can also be uploaded via the satellite link, start and stop times can be reported, over-speed conditions can be reported, changes to track conditions can be communicated to drivers and many other race administration tasks performed.

A bluetooth radio may also be provided to allow future connection with driver and navigator headset or to provide a wireless set of warning lights and inputs.

The functions and indications given by the vehicle unit are summarized in Table 1:

|  | Detail |
|---|---|
| Standard Functions | |
| Transit Screen | Displayed throughout the event in transport stage |
| Race Screen | Displayed whenever vehicle is in competition |
| Push to Pass (Blue Screen) | Warns slower forward cars that you intend to overtake |
| Slow Car | Warn oncoming drivers that a vehicle ahead has reached minimum speed |
| Hazard (Yellow Screen) | Warns oncoming drivers that a vehicle ahead is stationary and is in a hazardous position. Distance to hazard is displayed |
| OK (Green Screen) | Warns oncoming drivers that a vehicle ahead is stationary but not in a hazardous position. Approaching vehicles are safe to pass at current speeds. Distance to hazard is displayed |
| SOS (Red Screen) Flashing | Warns oncoming drivers that a vehicle ahead is stationary, in a hazardous position and is in need of urgent assistance Distance to hazard is displayed |
| SOS Acknowledged (Red Screen) Solid | Warns oncoming drivers that a vehicle ahead is stationary, in a hazardous position and it has been acknowledged that assistance is required. Distance to hazard is displayed |
| Timing | Timing vehicle unit has the ability to time from 1 sec to .01 sec depending on event requirements. Timing to .001 is in development Stage and race times can be viewed on screen |
| Additional Functions | |
| Flag signals | Any flag signals can be displayed automatically or manually by race control. Can include Red flag or Abandon Race |
| Speed restrictions | All forms of speed restrictions are displayed and logged from Restricted speed zones to service point speeds etc |
| Max Speed | Warns competitors that they have reached or exceeded the maximum speed allowed for the event. This notification is logged to vehicle unit and can be reviewed for infringement identification |
| Tracking | Tracking is available from full Google earth to defined incident status and these requirements will generally be determined by race requirements |

Optionally the vehicles are fitted with a crash sensor module in the form of a solid state G-force sensor. The sensor is based on an accelerometer and microprocessor technology.

The system has networking capabilities which enable all vehicles to communicate with each other but only specified information is displayed.

When used in a race or a rally the system operates as follows:

i) the location coordinates for each side of the race track or road are mapped over its entire length to provide a "basemap" of the road surface. This is logged into the on board programmable software of the microprocessor in the vehicle unit.

ii) for a vehicle traversing the mapped road or race track, the GPS then continuously monitors and records its position and compares this with the logged data. Vehicle speed is also monitored and recorded.

iii) continuous evaluation of actual vehicle performance data with the logged road map coordinates enables the system to instantaneously identify any condition which is outside the "normal" programmed parameters. Other abnormal situations are identified via GPS speed monitoring and the integrated "Crash Sensor" module. Abnormal conditions detected include: Vehicle moving outside road edge coordinates, vehicle changing normal orientation to track significant deceleration or if vehicle stopped, vehicle impact via G-force detector in Crash Sensor.

iv) the system is programmed to automatically generate a warning in accordance with the condition detected. This is simultaneously transmitted to other vehicles by UHF signals. The signal transmission range can be set by adjusting the UHF signal strength. Preferably the operating range for a rally competition stage would be between about 200 m and 2 km and increments there between as determined by line of sight. The distance of 2 km will be reduced in hilly terrain such as to about 500 m. The vehicle unit calculates the distance between the incident and vehicle to be warned and displays the distance to the incident from approximately 500 m or as deemed necessary by the conditions.

v) all associated data collected for each vehicle is stored on an internal memory device for later retrieval if necessary.

Motor sport event organisers have a requirement for data other than hazard warnings, to be both transmitted from and sent to vehicles, for the purposes of monitoring performance against legal requirements and for relaying other safety related information.

The type of data communicated to and from Event Command includes: direct voice communication link between vehicle and command, vehicle speed and warnings if predetermined maximums are exceeded, vehicle race/stage start times available in real time on the vehicle unit read out and actual finish time recorded and communicated to event command, relay of video camera footage from vehicle to command, relay of other safety related information such as weather and road conditions from command to vehicles, based on relevant GPS coordinates. This would replace manual warning board currently used.

The present invention in the preferred form is applicable to all motorsports including road races, rallies, circuit races go-kart races and motorbike races.

In order to set up the system of the present invention coordinates for the track/course are mapped with a GPS unit and downloaded into each module at the start of the stage/race. The position of the course outer limits is entered manually or by radio.

During a race if the vehicle unit in a particular vehicle determines that the vehicle is on the course (via GPS location) and moving below a preset low speed set point it would transmit "Slow Vehicle" to warn following vehicles.

If the Vehicle unit determines that the vehicle is not moving and is on the course (via GPS location) the vehicle unit uses the radio link to transmit "Yellow". This indicates "Hazard ahead". The message could be manually downgraded to "Green" if the driver/navigator deemed the location to be safe or upgraded to "Red" if medical assistance were required.

If the vehicle unit senses a crash of a severe nature and detects that the vehicle is not moving on the course the vehicle unit immediately transmits "Red" via all communication modes to request medical assistance. If the driver/navigator is not injured they may downgrade the alarm accordingly.

In each of the above instances the vehicle being warned would display the required message and distance to incident.

The Vehicle unit performs timing functions, tracking functions and automation functions. Where, in the unusual circumstance, the GPS unit fails, the radio link may be manually operated. The radio unit is for indication send and receive and for program load/upload.

The motorbike and kart versions only have coloured lights rather than screens as these are for track use and need to be more robust and weatherproof.

Accessories available for use with the present system include a remote "pass request" button, remote indications for driver in rally, visor indications, audible alarm output to intercom, start lights, data transmit units, heads up display and timing/distance measurement functions.

In its preferred form the invention may reduce or eliminate the secondary collisions, instantly inform safety crews of emergency location, severity of the impact, provide an effective flagging system in place at all times without human presence or intervention, provide Flag points on every corner in a rally, have Flag points that activate and report back to master control in real time, provide an awareness of the location of emergency vehicles, provide information regarding a stalled car on a start grid and its grid position, enable a safety system to be in place for practice days, allow for a precise first intervention plan for accidents and enable vehicle control to inform a driver if he is to render assistance or proceed, alert drivers to a speed restriction zone and any infringements thereof, allow examination of the data regarding speed, time, position and G Force, provide road book information on screen, potentially reduces event and insurance costs because of additional safety, save on personnel costs by avoiding the need for Flag Marshalls and allow master control with only safety crews on the ground.

MODES OF CARRYING OUT THE INVENTION

EXAMPLE 1

Use in Motor Racing

Each of the vehicles taking part in a race is fitted with the vehicle unit as described above. This vehicle unit is referred to below as the Rallysafe vehicle unit. The relevant parameters/coordinates are transmitted by radio, satellite or GSM into the unit's processor and memory and are then stored and used as required. These coordinates allows the vehicle to know its position/status at all times.

Primary vehicle unit to vehicle unit communication is conducted via DRT (Digital Radio Telemetry), delivering immediate notifications between vehicle units—typically less than 20 milliseconds. Functions are preset to collect and communicate specific information such as shown in Table 1.

When transmission of information occurs between vehicle units, the receiving vehicle unit confirms receipt and transmits a 'cease transmit' message back to close radio dialogue.

Master Control to Vehicle Unit Communications

Figure 7:
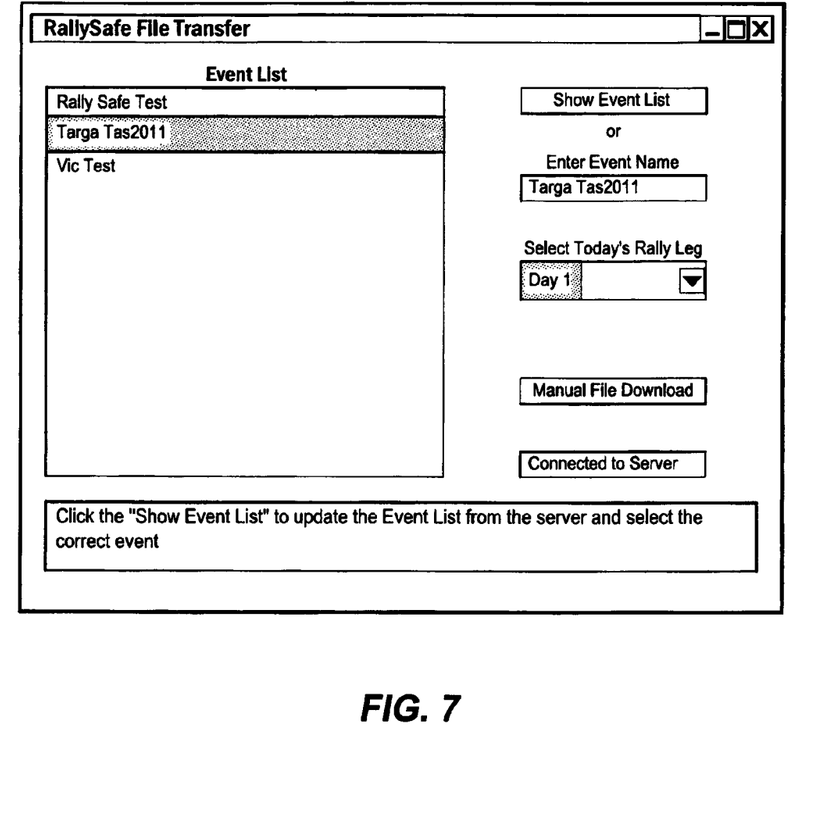
FIG. 7 shows a screen shot of the file transfer utility used in master control.

The RallySafe Master Control Unit is located at Race Control for each event Events are pre-programmed into the system and selected from the File Transfer Utility as shown in FIG. 7 which engages the appropriate event for live information feed via Satellite.

Stage Control Units can be located at the start and finish points of each stage, or alternatively data can be fed direct from vehicle to race control, collating live vehicle information which is automatically fed back to Race Control. The Master Control unit for the RallySafe system sits in Race Control.

Events are pre-programmed into the system and selected from the File Transfer Utility which engages the appropriate event for live information feed.

The features which may be catered for are outlined in Table 2 as follows:

TABLE 2

| Item | Impact |
| --- | --- |
| Event Location/s | May affect GPS, GRDT, SC and GSM in the area System is configured to cater for available communication options governed by geographical, environmental and social factors |
| Event Date/s | Number of vehicle units required and customization timings for project planning |
| GPS Coverage in area | System communications setup |
| Radio Frequency in Area (DRT) | System communications setup |
| GSM coverage | System communications setup |
| Additional Functions (to standard) | Timings for customisation and project planning |
| Setup period available for vehicle unit installations | Timings for RallySafe arrival at event vs event commencement |
| Anticipated number of vehicles | Number of vehicle units to be customized and installed |
| Number of Race Control base stations across the event | System recognition setup, timings for customization and project planning |

Figure 9:
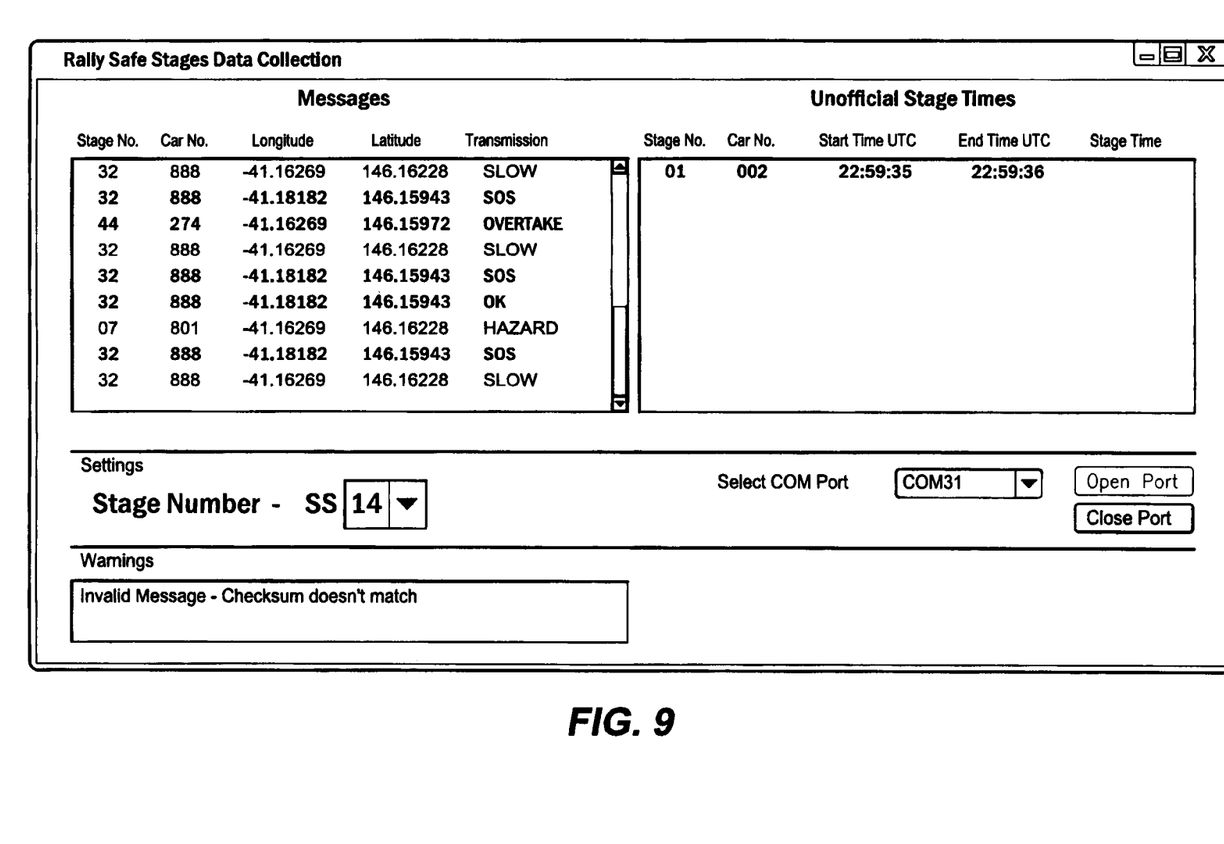
FIG. 9 shows a master control screen shot of the End Stage of vehicles in an event.
Figure 10:
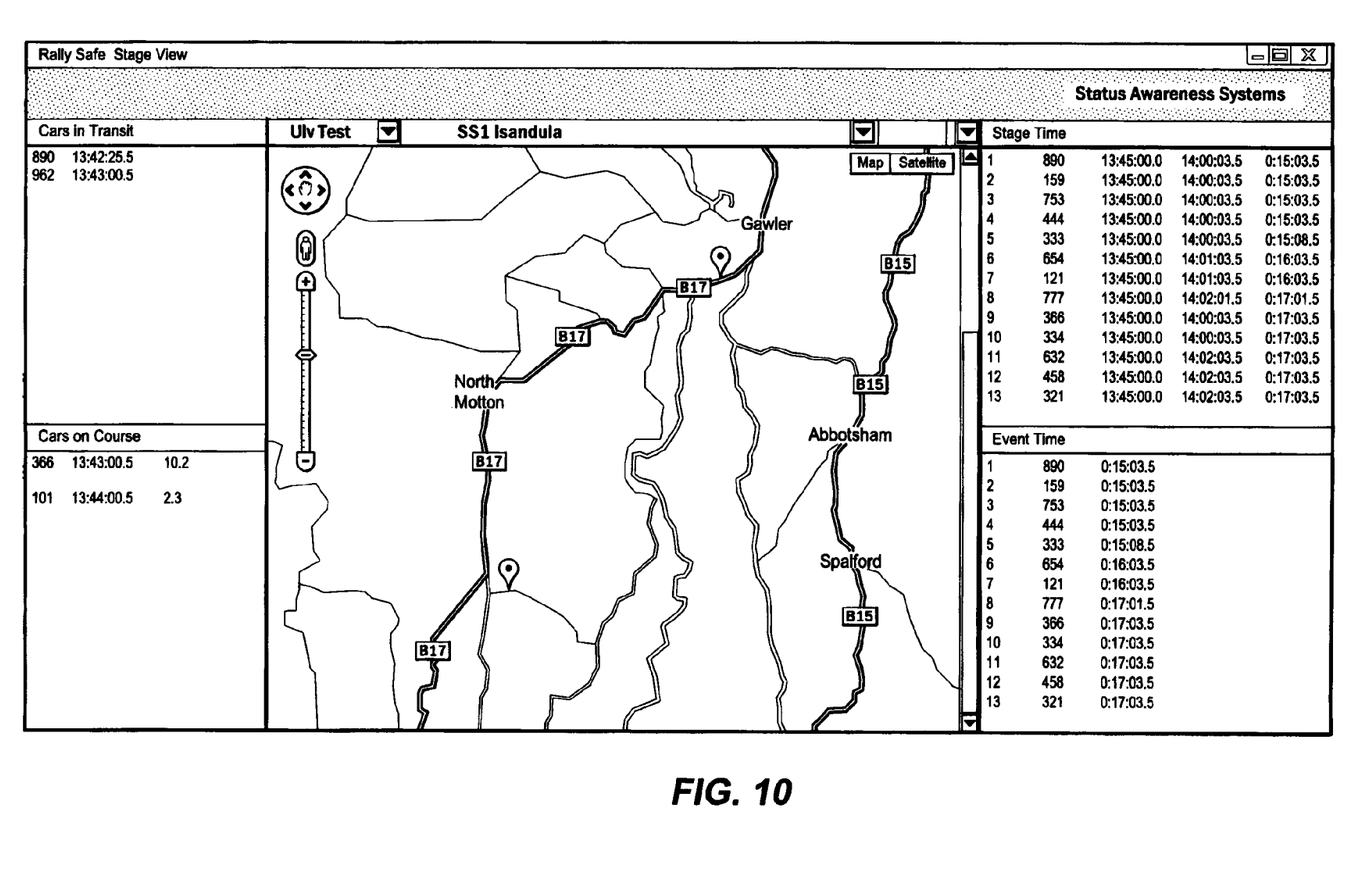
FIG. 10 shows a master control screen shot of the positions of the vehicles live during an event as determined by satellite.

Data collated from stage control points is displayed as Stage Status on the Master control Screen throughout the event as shown in FIGS. 8 and 9. FIG. 10 shows tracking during the event with Live Google Earth tracking information.

The live feed of information collated by Stage Control units is consolidated and displayed as Stage Status on the Master control Screen throughout the event.

This relatively timeless interaction reduces response times, ensures error free communications and eliminates congestion of radio environments. All transmissions are logged, enabling full review of data for identification of race rule infringements, breaches and for general evaluation, during and post event.

Although safety is the number one priority function of the system, the system provides data collection and Vehicle Data Summary, which allows for in-depth review of each vehicles performance.

Available data regarding transport speeds, jump starts and other race rule infringements; allows stewards to make faster, fairer informed decisions. RallySafe takes the pressure off flag marshals and requires fewer, accountable event personnel.

The system can be used at start lines to communicate to starter. It also provides accurate stage timing for rally events, accurate lap timing for track training, allows vehicle tracking and provides information on road conditions.

The system logs a massive amount of valuable data. An entire 10 day event could be logged to the system, enabling the comprehensive review of vehicle performance data and all transmission and receipt of warning signals issued. It can therefore be likened to a 'black box' for information retrieval post incident or post event.

EXAMPLE 2

Motor Racing Trials

The RallySafe System has undergone extensive trialling over the last quarter of 2010 through to 2011 and was successfully measured in competitive conditions during the 2010 Targa High Country event, held in Victoria Australia.

The system received glowing reports and an arrangement has been made with Targa Tasmania for each vehicle entered in the 2011 Tasmanian event.

A total of 300 vehicle units were manufactured and installed for Targa Tasmania prior to competition and the system successfully identified vehicles involved in incidents. Other vehicles were notified of these incidents and secondary collisions were avoided.

Rally type events such as Targa Tasmania are conducted in extreme topographical environments meaning that the system can more than handle friendlier conditions of race circuits; with modifications and additions, specific to high speed racing.

EXAMPLE 3

FIA International Rally of Whangarei—July 2011

RallySafe vehicle units were installed in 5 cars competing in the Clubman Rally component of the FIA International Rally of Whangarei in New Zealand on the $16^{th}$ and 17th of July, with feedback from these competitors being extremely positive.

The system worked faultlessly and of the five cars fitted with the vehicle unit, four met early retirement; with the fifth vehicle winning the event.

Across this event, basic GSM communications were used with Telstra Australia modems utilised in roaming format to report information back from stage end points to master control for post event evaluation.

Information was collated throughout the event such as tracking to speed limit breaches, start and finish times.

The safety features of the system were evident throughout the event, with car to car warnings receiving very positive feedback.

The benefits of the Car to car warnings were commented on and acknowledged as important by competitors using the system.

Warnings where given out at 1 km in advance to drivers of vehicles ahead in hazardous conditions in a bitumen event at high speed.

After close observation of the NZ terrain, we would anticipate reducing the distance presented to sub 500 m for future gravel events The early retirement of four of the cars fitted with the RallySafe vehicle units, has provided an interesting set of data for review and demonstrates the value of the reporting mechanisms inside the system.

Timing, speed and distance are recorded both on Stage and in Transit; and the system allows g forces to be viewed and identifies vehicles in off track locations.

Throughout this specification and the claims that follow, unless the context requires otherwise the words "comprise", "comprises", "comprising" will be understood to mean the inclusion of the stated integer, step or group of integers or steps but not the exclusion of any of other integer, step or group of integers or steps.

The claims defining the invention are as follows:

1. An improved system of communication of safety information suitable for communication between at least two vehicles on a route, said improved system comprising:
    a) a signal transmission means and a signal reception means for a first vehicle;
    b) a compatible signal transmission means and a compatible signal reception means for at least one other vehicle;
    c) a communication signal means for generating a communication signal from the first vehicle to the at least one other vehicle which means is activatable by one or more of a driver, the first vehicle or a sensor in the first vehicle; and
    d) a portable screen for displaying a persistent visual indicator, until deactivated, which has a predetermined meaning recognizable by the drivers, wherein the persistent visual indicator is displayed only on other vehicles that are within a predetermined range and that are approaching said first vehicle.

2. The system of claim 1 wherein the signal transmission means and signal reception means comprises UHF transceivers and wherein the communication signal means is activatable by sensors in the vehicles according to predetermined parameters and/or manually.

3. The system of claim 1 wherein the visual indicator is a coloured light and/or colour screen.

4. The system of claim 1 wherein the safety information comprises the speed and/or condition of the first vehicle on the route, speed restrictions on a particular part of the route, a major collision on the route, a roadway which is partly or fully blocked and/or another vehicle breakdown and wherein the visual indicator comprises a coloured light and/or screen.

5. The system of claim 1 wherein the visual indicator can be changed manually by upgrading the visual indicator to a more serious warning or downgrading the visual indicator to a less serious warning, as required.

6. The system of claim 1 wherein the visual indicator is given if the hazard or potential hazard is a distance of about 2000 m or less from a vehicle.

7. The system of claim 1 wherein the visual indicator is given if the hazard or potential hazard is a distance of about 1000 m or less from a vehicle.

8. The system of claim 1 wherein the visual indicator is given if the hazard or potential hazard is a distance of about 500 m or less from a vehicle.

9. The system of claim 1 wherein the communication signals generated by said first vehicle is relayed to said at least one other vehicle by a third vehicle and/or relay stations and/or a master control.

10. An electronic communication device when used in the system of claim 1.

11. An improved vehicle rally safety warning system which allows communication of hazards, potential hazards or other relevant information between a master control, drivers and/or the vehicles being driven by providing a visual indicator for predetermined conditions selected from a set of distinguishable visual indicators, said system comprising
    a first vehicle having a signal transmission means and a signal reception means;
    at least one other vehicle having a compatible signal transmission and reception means;
    a master control having a compatible signal transmission means and a signal reception means; and
    a portable interactive display unit for each of said first vehicle and said at least one other vehicle and a corresponding display unit for said master control,
    whereby a communication signal means is activatable by one or more of a driver, the first vehicle or a sensor in the first vehicle and/or by said master control and activation results in a visual indicator being generated on said interactive display unit in one or more of the other vehicles or on the corresponding display unit of the master control, wherein the visual indicator persists, until deactivated, and includes coloured lights or a coloured display on the interactive display unit which colours correspond to international safety and racing convention warning flags and colours.

12. The system of claim 11 wherein the visual indicators also comprise information about location and /or distance to a hazard.

13. The system of claim 11 wherein the first vehicle and the at least one other vehicle each includes a Global Positioning System (GPS) receiver and wherein an automated warning system is provided which system generates a signal to event controllers and/or the at least one other vehicle on a mapped route, when the GPS detects that the first vehicle moves outside of one or more predetermined parameters on the route.

14. The system of claim 11 wherein the other information includes vehicle speed, vehicle orientation relative to the route and road edge coordinates.

15. An electronic communication device for a vehicle said device suitable for gathering and relaying relevant information about other vehicles fitted with a similar device on a route, said electronic communication device comprising:
    one or more signal transmission means,
    one or more signal reception means,
    a portable information display means for displaying the information,
    sensors for detecting predetermined conditions of the vehicle,
    a Global Positioning System (GPS) receiver for determining the position and velocity of the vehicle and
    a processor and associated software for managing the information and signals wherein the processor generates signals based on the status of the vehicle for display on information display means for other vehicles that are within a predetermined range and are approaching the vehicle.

* * * * *